(12) United States Patent
Zhao et al.

(10) Patent No.: US 9,767,567 B2
(45) Date of Patent: Sep. 19, 2017

(54) METHOD AND APPARATUS FOR SEPARATING FOREGROUND IMAGE, AND NON-TRANSITORY COMPUTER-READABLE RECORDING MEDIUM

(71) Applicants: Ying Zhao, Beijing (CN); Gang Wang, Beijing (CN); Liyan Liu, Beijing (CN)

(72) Inventors: Ying Zhao, Beijing (CN); Gang Wang, Beijing (CN); Liyan Liu, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/930,009

(22) Filed: Nov. 2, 2015

(65) Prior Publication Data
US 2016/0133027 A1  May 12, 2016

(30) Foreign Application Priority Data
Nov. 12, 2014  (CN) .......................... 2014 1 0645593

(51) Int. Cl.
*G06K 9/00*  (2006.01)
*G06T 7/194*  (2017.01)
(Continued)

(52) U.S. Cl.
CPC .......... *G06T 7/0081* (2013.01); *G06K 9/3233* (2013.01); *G06T 7/11* (2017.01);
(Continued)

(58) Field of Classification Search
CPC ......... G06T 7/0079; G06T 2207/20144; G06T 7/194; G06T 2207/20112; G06K 9/0014
(Continued)

(56) References Cited

U.S. PATENT DOCUMENTS

2009/0315910 A1* 12/2009 Kambhamettu ...... G06T 7/0081
345/589
2010/0061658 A1*  3/2010 Yamada ................ G06T 7/0081
382/282

(Continued)

OTHER PUBLICATIONS

Crabb et al. ("Real-time foreground segmentation via range and color imaging," IEEE Computer Vision and Pattern Recognition Workshops, 2008].*

(Continued)

*Primary Examiner* — Yubin Hung
(74) *Attorney, Agent, or Firm* — Harness, Dickey & Pierce P.L.C.

(57) ABSTRACT

A method and an apparatus for separating a foreground image are disclosed. The method includes obtaining an input image, and color information and depth information of the input image; roughly dividing, based on the depth information of the input image, the input image to obtain an initial three-color image; reducing or expanding, based on the color information of the input image, an unknown region in the initial three-color image to obtain an optimized three-color image; and separating the foreground image from the optimized three-color image. According to the method, the initial three-color image can be optimized based on the color information of the input image, so that a more accurate three-color image can be obtained; thus the foreground image can be accurately separated from the three-color image.

18 Claims, 10 Drawing Sheets

(51) Int. Cl.
  *G06T 7/00* (2017.01)
  *G06K 9/32* (2006.01)
  *G06T 7/11* (2017.01)

(52) U.S. Cl.
  CPC ............ *G06T 7/194* (2017.01); *G06K 9/0014* (2013.01); *G06T 2207/10004* (2013.01); *G06T 2207/10028* (2013.01)

(58) Field of Classification Search
  USPC .................................................. 382/164, 173
  See application file for complete search history.

(56) References Cited

U.S. PATENT DOCUMENTS

| | | | | |
|---|---|---|---|---|
| 2012/0020554 A1* | 1/2012 | Sun | ...................... | G06T 7/0081 382/164 |
| 2012/0294519 A1* | 11/2012 | He | .......................... | G06K 9/34 382/164 |
| 2013/0136358 A1* | 5/2013 | Dedhia | ................. | G06T 7/0093 382/173 |
| 2013/0230237 A1* | 9/2013 | Schlosser | .............. | G06T 7/0081 382/164 |
| 2014/0003719 A1* | 1/2014 | Bai | ....................... | G06T 7/2066 382/173 |
| 2015/0003725 A1* | 1/2015 | Wan | ...................... | G06T 7/0081 382/154 |
| 2015/0055828 A1 | 2/2015 | Zhao et al. | | |
| 2015/0243038 A1 | 8/2015 | Zhao | | |
| 2015/0254868 A1* | 9/2015 | Srikanth | ................ | G06T 7/0081 348/47 |

OTHER PUBLICATIONS

Lu et al. ("Image matting with color and depth information," 21st International Conference on Pattern Recognition, Nov. 11-15, 2012, pp. 3787-3790).*

Chuang et al. ("A Bayesian approach to digital matting," IEEE Proceedings of the Conference on CVPR, Dec. 8-14, 2001).*

He et al. ("A Global Sampling Method for Alpha Matting," IEEE Proceedings of the Conference on CVPR, Jun. 20-25, 2011).*

Hsieh et al. ("Automatic trimap generation for digital image matting," IEEE Signal and Information Processing Association Annual Summit and Conference, Oct. 29-Nov. 1, 2013).*

Singh et al. ("Automatic trimap and alpha-matte generation for digital image matting," IEEE Sixth International Conference on Contemporary Computing, Aug. 8-10, 2013).*

* cited by examiner

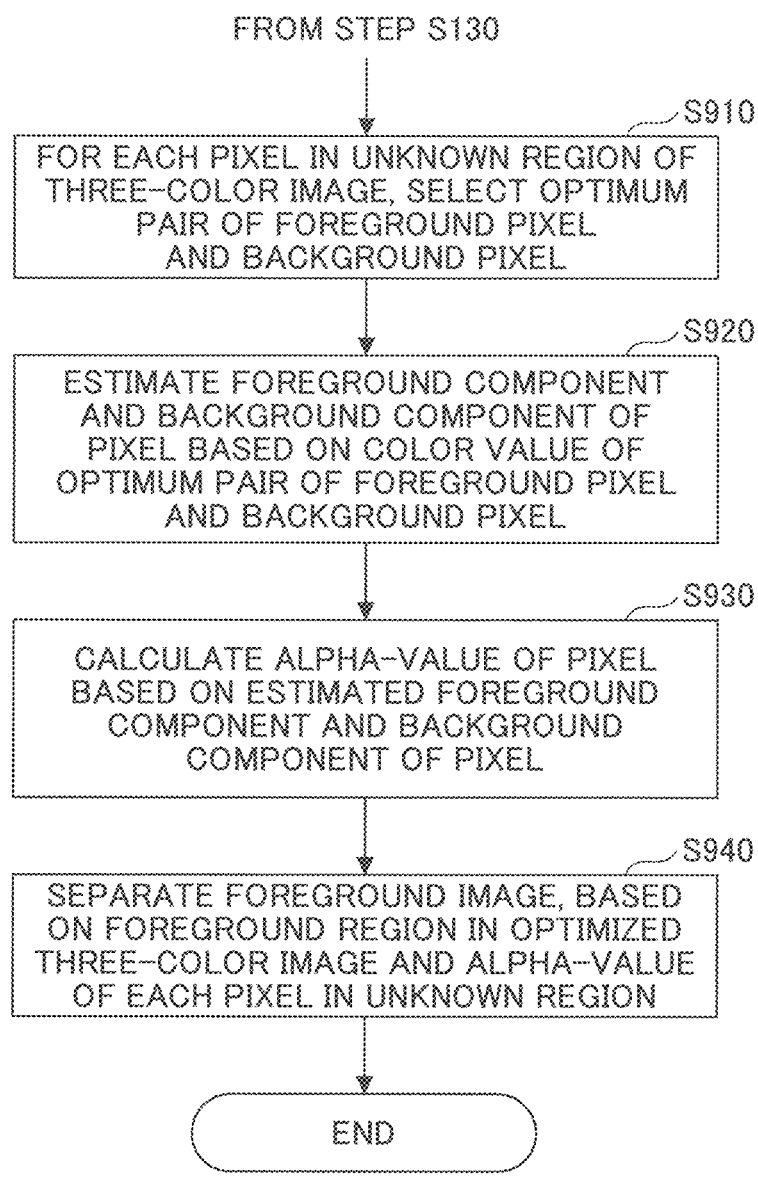

| UNKNOWN POINTS | FOREGROUND SAMPLES | BACKGROUND SAMPLES |
|---|---|---|
| p ▲ | △ | △ |
| q ◉ | ◉ | ○ |

| UNKNOWN POINTS | FOREGROUND SAMPLES | BACKGROUND SAMPLES |
|---|---|---|
| p ▲ | △ | △ |
| q ⊛ | ⊚ | ○ |

US 9,767,567 B2

METHOD AND APPARATUS FOR SEPARATING FOREGROUND IMAGE, AND NON-TRANSITORY COMPUTER-READABLE RECORDING MEDIUM

BACKGROUND OF THE INVENTION

1. Field of the Invention

The present invention generally relates to the field of image processing, and specifically, a method and an apparatus for separating a foreground image from an image.

2. Description of the Related Art

The technology of foreground image separation, i.e., the technology of image cut-out means extracting or separating an object from an image and estimating the transparency, i.e., Alpha-value ($\alpha$ masking) of each pixel in a region covered by the object. An extracted object region is referred to as a "foreground region" or a "foreground image" of an image, and other portions are referred to as a "background region" or a "background image" of the image.

Such technology is widely applied in image or video editing applications. A user can separate foreground by this technology and combine the foreground with another background. As an example, in virtual photographing, the foreground such as a person can be combined with the virtual background to obtain an immersive experience, and for example, a conference participant can be separated from the original background in a video conference and be combined with another background.

From the viewpoint of image composition (image combination), an image $I(x,y)$ may be modeled as a linear combination of a foreground image $F(x,y)$, a background image $B(x,y)$ and a $\alpha(x,y)$ value, as shown in the following formula (1).

$$I_p = \alpha_p F_p + (1-\alpha_p) B_p \quad (1)$$

In which $I_p$ is a pixel value of a pixel p of an image, $F_p$ is a foreground component of the pixel p, $B_p$ is a background component of the pixel p, $\alpha_p$ is an Alpha-value of the transparency and the range of $\alpha_p$ is [0,1]. When $\alpha_p=1$, the pixel p belongs to a foreground region, and when $\alpha_p=0$, the pixel p belongs to a background region.

That is to say, an image cut-out problem becomes a problem to solve the above equation. Therefore, a three-color image is usually used as a limitation of an additive condition to solve the equation. The three-color image includes marked images of three colors, i.e., black, white and gray images, where each color represents a region type. The black represents a known background region, the white represents a known foreground region, and the gray presents an unknown region, in which regions belonging to the background and regions belonging to the foreground cannot be determined.

Because of the introduction of a three-color image, solving of an image cut-out becomes calculating an Alpha-value, a foreground component $F_p$ and a background component $B_p$ of unknown pixels p (rather than all pixels of a whole image). $F_p$ and $B_p$ can be obtained by performing estimation based on adjacent points of the pixel p. After obtaining $F_p$ and $B_p$, Alpha-value $\alpha_p$ of the pixel p can be obtained according to the following formula (2).

$$\alpha_p = \frac{(I_p - B_p) * (F_p - B_p)}{\|F_p - B_p\|^2} \quad (2)$$

From the above, the forming of a three-color image is the basis of image cut-out processing, and a more accurate three-color image helps to separate a foreground object from an image or a video more accurately.

In the current methods for forming a three-color image, a three-color image in an image may be specified by a user in a user-interaction way, and for example, to draw some line segments in an image to specify which part is the foreground and which part is the background in the image. In this method, it is necessary for the user to generate the three-color image manually, thus it takes user's labor and the generated three-color image is not accurate enough. Depth information may also be introduced to help to automatically generate a three-color image. In this method, user interaction is not required, however an accurate three-color image still cannot be generated in some cases. For example, in a case where a foreground region includes only one color and the color does not appear in other foreground regions, the region may be marked as an unknown region, and as a result, the region may be classified as a background region incorrectly.

Furthermore, as described above, calculation of an Alpha-value of a unknown pixel p relies on sampling of known foreground points and background points in an adjacent region of the pixel p, therefore obtaining more accurate foreground sample points and background sample points is very important for calculation of Alpha-values, e.g., the quality of cut-out.

SUMMARY OF THE INVENTION

In view of the above problems, the present invention has an object to provide a method and an apparatus that can accurately separate a foreground image from an image.

According to an aspect of the present invention, a method for separating a foreground image may include: obtaining an input image, and color information and depth information of the input image; roughly dividing, based on the depth information of the input image, the input image to obtain an initial three-color image; reducing or expanding, based on the color information of the input image, an unknown region in the initial three-color image to obtain an optimized three-color image; and separating the foreground image from the optimized three-color image.

In an alternative embodiment, reducing or expanding the unknown region in the initial three-color image based on the color information of the input image may include: dividing the unknown region of the initial three-color image into a plurality of local regions; and for each local region, determining whether color distribution in the local region satisfies a predetermined condition, and reducing or expanding the local region until the color distribution of the local region satisfies the predetermined condition when the predetermined condition is not satisfied.

In an alternative embodiment, the predetermined condition may be that there are two kinds of colors in the local region.

In an alternative embodiment, the method for separating a foreground image may further include: detecting a gap region between constituent parts of a foreground object; and marking the gap region in the reduced or expanded three-color image as a part of the unknown region, so as to obtain the optimized three-color image.

In an alternative embodiment, separating the foreground image from the optimized three-color image may include: for each pixel in the unknown region of the optimized three-color image, selecting an optimum pair of a foreground pixel and a background pixel of the pixel from an adjacent region of the pixel; estimating, based on color values of the optimum pair of the foreground pixel and the background pixel, a foreground component and a background component of the pixel; calculating, based on the estimated foreground component and background component of the pixel, an Alpha-value of the pixel; and separating, based on the foreground region in the optimized three-color image and the Alpha-values of the pixels in the unknown region, the foreground image.

In an alternative embodiment, selecting the optimum pair of the foreground pixel and the background pixel of the pixel from the adjacent region of the pixel may include: performing a weighted linear transformation for the color information of the input image to obtain the transformed color information of the input image, by using the depth information of the input image as a weight; for each pixel in the unknown region in the optimized three-color image, selecting a plurality of foreground pixel samples from the foreground region in the adjacent region of the pixel, and selecting a plurality of background pixel samples from the background region in the adjacent region of the pixel, so as to constitute a sample set; for pairs of foreground pixels and background pixels constituted of any foreground pixel and any background pixel in the sample set, constructing, based on the transformed color information and spatial position information of the pairs of the foreground pixels and the background pixels, an energy function; and obtaining a pair of the foreground pixel and the background pixel that minimize the energy function, as the optimum pair of the foreground pixel and the background pixel.

In an alternative embodiment, estimating the foreground component and the background component of the pixel based on the color values of the optimum pair of the foreground pixel and the background pixel may include: for each pixel in the adjacent region of the pixel, obtaining the corresponding optimum pair of the foreground pixel and the background pixel; calculating an average value of the color value of the foreground pixel in the optimum pair of the foreground pixel and the background pixel of the pixel and color values of the foreground pixels in the optimum pairs of the foreground pixels and the background pixels of pixels in the adjacent region of the pixel, as an estimating value of the foreground component of the pixel; and calculating an average value of the color value of the background pixel in the optimum pair of the foreground pixel and the background pixel of the pixel and color values of the background pixels in the optimum pairs of the foreground pixels and the background pixels of pixels in the adjacent region of the pixel, as an estimating value of the background component of the pixel.

In an alternative embodiment, calculating the Alpha-value of the pixel based on the estimated foreground component and background component of the pixel may include: calculating an Alpha-estimating-value using the estimated foreground component and background component of the pixel; calculating offsets between the estimated foreground component and background component, and an actual color value of the pixel; calculating, based on the Alpha-estimating-value of the pixel and the offsets, a confidence level for calculating the Alpha-value of the pixel using the estimated foreground component and background component of the pixel; and calculating, based on the Alpha-estimating-value and the confidence level, the Alpha-value of the pixel.

According to another aspect of the present invention, an apparatus for separating a foreground image may include: an obtainment unit configured to obtain an input image, and color information and depth information of the input image; a rough-division unit configured to roughly divide, based on the depth information of the input image, the input image to obtain an initial three-color image; a three-color image optimization unit configured to reduce or expand, based on the color information of the input image, an unknown region in the initial three-color image to obtain an optimized three-color image; and a foreground image separation unit configured to separate the foreground image from the optimized three-color image.

In an alternative embodiment, the three-color image optimization unit may divide the unknown region of the initial three-color image into a plurality of local regions; and for each local region, determine whether color distribution in the local region satisfies a predetermined condition, and reduce or expand the local region until the color distribution of the local region satisfies the predetermined condition when the predetermined condition is not satisfied.

According to the present invention, an initial three-color image can be generated based on depth information from an input image and the initial three-color image can be optimized based on color information of the input image, so that a more accurate three-color image can be obtained; thus the foreground image can be accurately separated from the three-color image.

Furthermore, according to the present invention, a weighted linear transformation can be performed for color information of an input image to distinguish similar colors in foreground and background, and an optimum sample can be selected to calculate an Alpha-value of unknown pixels since a good sampling policy is used; thus separation accuracy of the foreground image can be further improved.

BRIEF DESCRIPTION OF THE DRAWINGS

FIG. 9 is a flowchart illustrating a method for separating a foreground image based on an optimum pair of samples according to another embodiment of the present invention;

DETAILED DESCRIPTION OF THE PREFERRED EMBODIMENTS

In the following, embodiments of the present invention are described in detail with reference to the accompanying drawings, so as to facilitate the understanding of the present invention.

Figure 1:
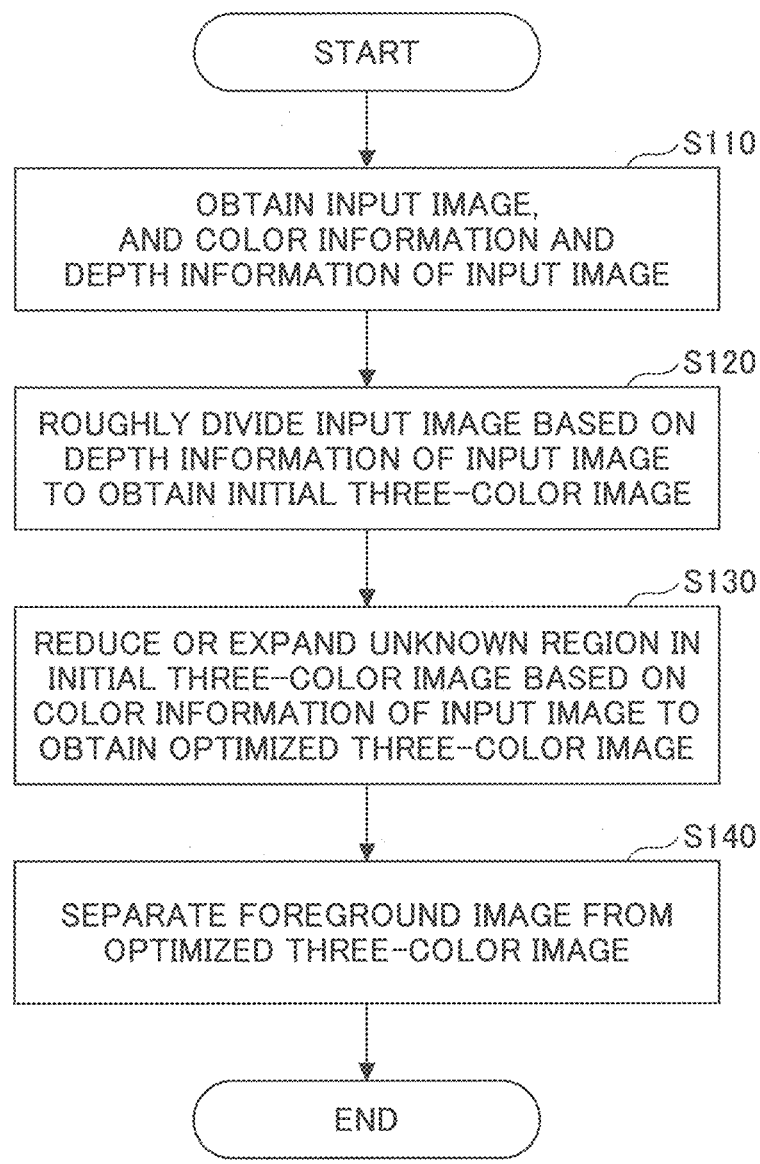
FIG. 1 is a flowchart illustrating a method for separating a foreground image according to an embodiment of the present invention.

FIG. 1 is a flowchart illustrating a method for separating a foreground image according to an embodiment of the present invention.

As shown in FIG. 1, the method for separating the foreground image may include: step S110, obtaining an input image, and color information and depth information of the input image; step S120, roughly dividing, based on the depth information of the input image, the input image to obtain an initial three-color image; step S130, reducing or expanding, based on the color information of the input image, an unknown region in the initial three-color image to obtain an optimized three-color image; and step S140, separating the foreground image from the optimized three-color image.

The input image obtained in step S110 may include a color image as an object where a cut-out process is performed, and a depth image corresponding to the color image. There is a photographing apparatus that can capture both color information and depth information of a scene in the art, such as a PrimeSense camera, a Kinect or other depth camera. Accordingly, the color information and the depth information of the input image can be obtained at the same time. It should be noted that, any method for obtaining color information and depth information of an image in the art may be applied to the present invention, and the obtainment method of the present invention is not limited, as long as color information and depth information can be obtained.

For example, in an embodiment, an RGB color image and a depth image of a target scene are photographed by a depth camera. Pixel values of the depth image represent distances from an object in the scene to the camera at a certain point in time. In a calculation process of the present invention, depth values are normalized to the range [0,1], the boundary value 1 represents an object closest to the camera, and the boundary value 0 represents an object at infinity from the camera or an object beyond an operation range of the camera.

In step S120, the input image is roughly divided based on the depth information of the input image to obtain an initial three-color image. In the following, as an example of a foreground object, the separation of the foreground object will be described for a "person", however the foreground object of the present invention is not limited to a person.

For example, a conventional method may be used to detect a person in the input image. As an example, a template matching method or corresponding library functions provided by a depth camera Kinect of Microsoft Corporation may be used to detect an object. It may be assumed that pixels belong to the foreground or the background based on the detected object (a region of the person) to generate the initial three-color image.

The generation process may include performing a threshold determination for the depth information of pixels in the input image, so as to determine whether the pixels belong to a foreground region. For example, it may be assumed that the region of the detected person is a foreground region. For pixels other than the region, if depth value of the pixel and a depth average value of the region of the person are continuous (for example, a difference between the depth value of the pixel and the depth average value is less than a predetermined threshold), it may be determined that the pixel belongs to a foreground region; and if there is an obvious difference between the depth value and the depth average value of the region of the person (for example, the difference between the depth value of the pixel and the depth average value is greater than the predetermined threshold), it may be determined that the pixel belongs to a background region. Furthermore, an unknown region may be obtained by reducing or expanding the region of the detected person. Accordingly, the initial three-color image is obtained.

Figure 2:
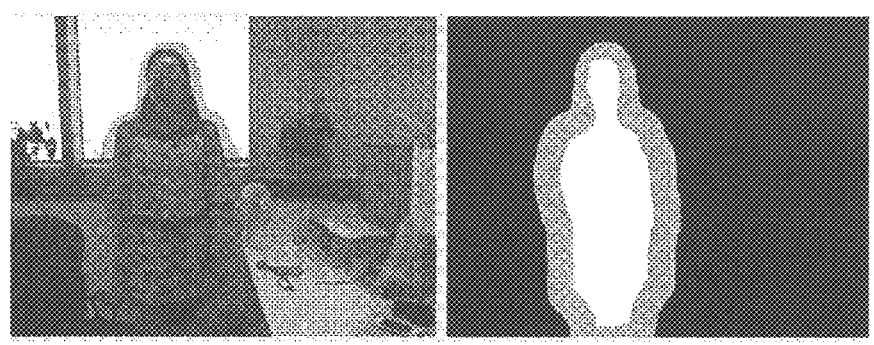
FIG. 2 is a schematic drawing illustrating an example of an input image and a corresponding initial three-color image.

FIG. 2 is a schematic drawing illustrating an example of the input image and the corresponding initial three-color image, in which the white region represents the foreground region, the black region represents the background region, and the gray region represents the unknown region.

It should be noted that, in the method for generating the initial three-color image based on the depth information, as the foreground object, a person is described above; however, the foreground object in the present invention is not limited to a person. For any other object, such as an animal or an object, if a corresponding shape feature or any other feature that can be used in the detection is previously obtained or stored, the detection may also be performed based on the depth information according to these features, and the description is omitted here.

Because the accuracy of the depth camera is low, boundary of the detection result is rough, and the foreground region obtained by the object detection in step S120 usually includes some background points or misses some foreground points. Thus, in the embodiment of the present invention, the initial three-color image is optimized in step S130 to mark the unknown region accurately.

As described above, the marking of the unknown region in the three-color image may affect the quality of image cut-out. It was discovered by the present inventors that, when a foreground region includes only one color and the color does not appear in other foreground regions (such as a hair region of a person in white clothes), and the region is marked as an unknown region, the region will be classified as a background region incorrectly; thus the quality of the image cut-out deteriorates.

Accordingly, the present invention provides a condition for optimizing the unknown region, in which the unknown region includes one foreground color and one background color within a local region. Thus, in step S130, the unknown region in the initial three-color image is reduced or expanded based on the color information of the input image to obtain an optimized three-color image.

In an embodiment, the unknown region may be iteratively reduced or expanded (shrunk or swelled) based on color distribution information of the unknown region divided in the initial three-color image, until colors of the region satisfy the condition. For example, the unknown region of the initial three-color image may be divided into a plurality of local regions; and for each local region, it may be determined whether color distribution in the local region satisfies the condition, and the local region may be reduced or expanded until the color distribution of the local region satisfies the condition if the condition is not satisfied.

Figure 3:
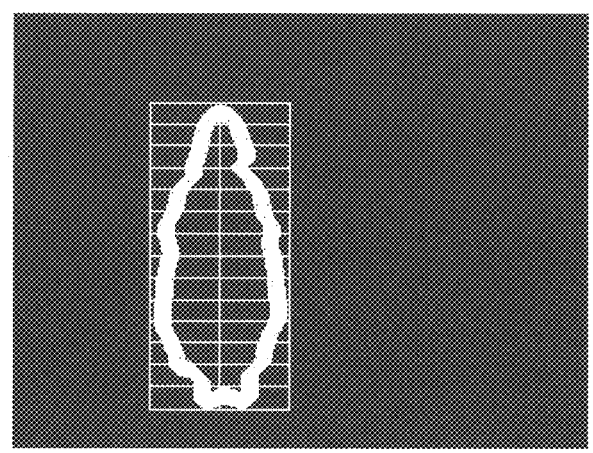
FIG. 3 is a schematic drawing illustrating an example of division of an unknown region.

FIG. 3 is a schematic drawing illustrating an example of division of the unknown region. As shown in FIG. 3, a bounding rectangle enclosing the unknown region is obtained, the region of the bounding rectangle is divided into approximately symmetrical left and right parts based on an approximate centerline of the foreground region in the bounding rectangle, and each of the two parts is divided into a plurality of rectangular small regions; thus the unknown region is divided into a plurality of the local regions. It should be noted that, in order to highlight the unknown region, in FIG. 3, the unknown region is shown in white, and the foreground region and the background region are shown in black. It is should be noted that, the division of the unknown region illustrated in FIG. 3 is just an example, and any other appropriate division method may also be possible.

Figure 4:
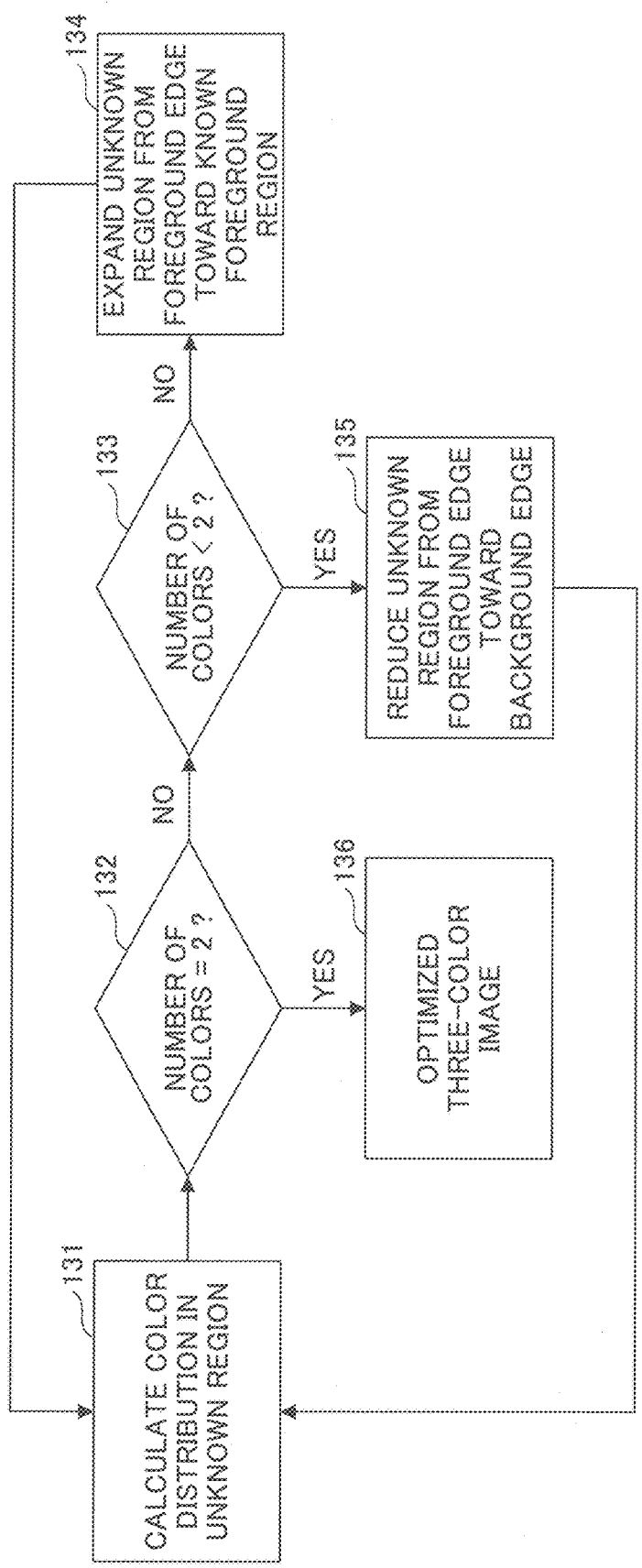
FIG. 4 is a flowchart illustrating a flow of optimization of unknown regions in each of divided rectangular small regions in FIG. 3.

FIG. 4 is a flowchart illustrating a flow of optimization of an unknown region in each of the divided rectangular small regions in FIG. 3. As illustrated in FIG. 4, in step S131, color distribution in the unknown region is calculated based on the color information obtained in step S110. For example, a color distribution histogram may be calculated using a KNN (K-nearest neighbor) algorithm to obtain the color distribution information.

Figure 5A:
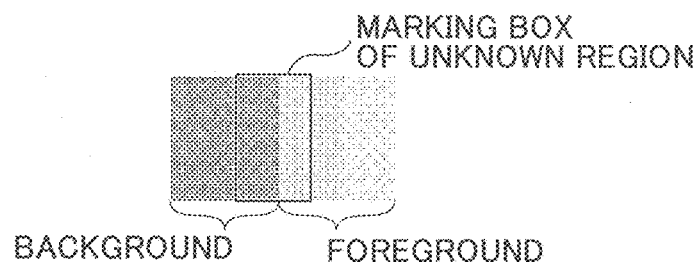
FIGS. 5A to 5C are schematic drawings illustrating examples of unknown regions and corresponding reducing-expanding processing.

In step S132, it is determined whether the number of colors in the unknown region is equal to 2. If YES, the processing proceeds to step S136, the reducing-expanding processing is not performed for the unknown region, and the optimization of the unknown region is finished. FIG. 5A is a schematic drawing illustrating the unknown region that satisfies the condition. In FIG. 5A, the unknown region of the local region is shown as a regular rectangle, however the unknown region may also be an irregular shape.

Figure 5B:
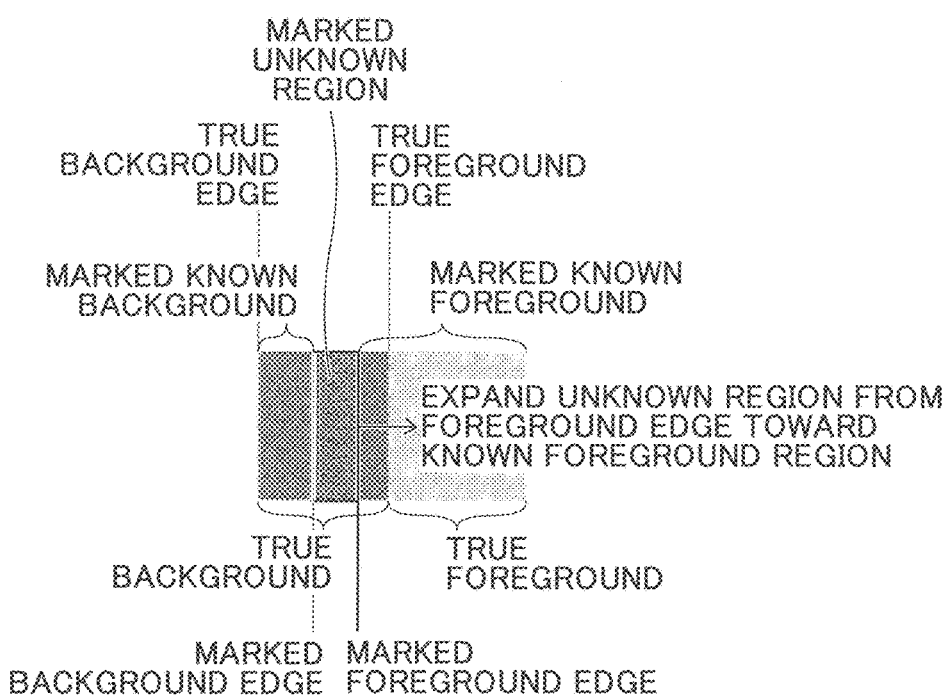
Figure 5C:
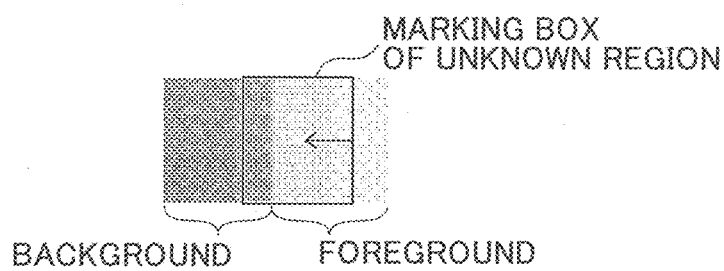

On the other hand, if the number of colors in the unknown region is not equal to 2, the processing proceeds to step S133, and it is determined whether the number of colors is less than 2. If YES, it means that the unknown region includes only background points and the true foreground edge may be not covered as illustrated in FIG. 5B; thus, in step S134, the unknown region is expanded from a foreground edge toward the known foreground region (expanding processing). If NO, namely the number of colors in the unknown region is greater than 2, it means that the unknown region may include a lot of foreground points (include foreground more than one color) as illustrated in FIG. 5C; thus, in step S135, the unknown region is reduced from the foreground edge toward a background edge (reducing processing).

The above reducing or expanding processing may be performed by morphological operations, which morphological operations can be easily realized by a person skilled in the art, and the details thereof are omitted here.

The reducing or expanding processing is performed repeatedly for each of the divided local regions, until the number of colors of the unknown region satisfies the condition. Thus, in step S130, the three-color image in which the unknown region has been optimized is obtained, so that the unknown region for subsequent image cut-out can be separated more accurately.

Figure 6:
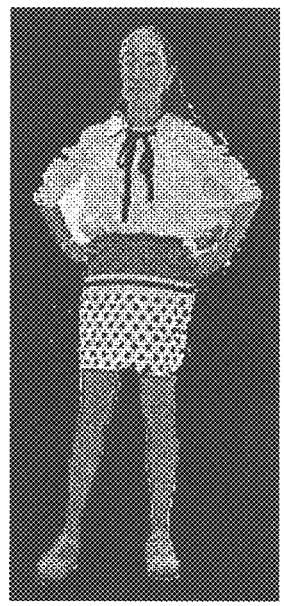
FIG. 6 is a schematic drawing illustrating an image cut-out result with gaps.

In some cases, gaps may be formed between constituent parts of a foreground object, such as gaps between arms of a person and body. The gaps cannot be removed from the foreground region by morphological operations, thus some background may still remain in a result of cut-out. FIG. 6 is a schematic drawing illustrating an image cut-out result with gaps. As illustrated in FIG. 6, the two triangular regions formed between the arms of the person and the body are gap regions including background images.

Accordingly, in an alternative embodiment, a gap is detected for the input image, and the detected gap is marked as the unknown region. For example, skeleton information may be calculated. Specifically, arm nodes such as shoulders, elbows and wrists, and leg nodes such as crotch, knees and ankles may be obtained from the input image by a method provided by Kinect SDK, a method of model-based human pose estimation with spatio-temporal inferencing, thus the skeleton information is obtained.

Figure 7:
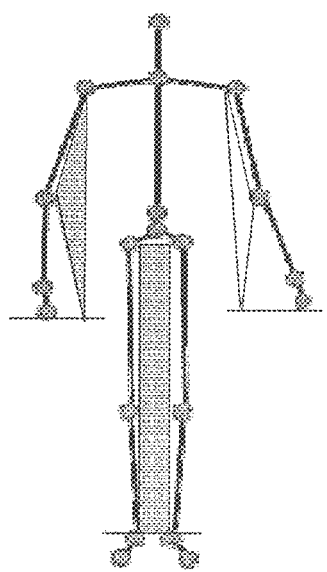
FIG. 7 is a schematic drawing illustrating an example of marking gap regions using skeleton information.

FIG. 7 is a schematic drawing illustrating an example of marking the gap regions using the skeleton information. As illustrated in FIG. 7, a triangle is formed by arm nodes such as shoulders, elbows and wrists, and the triangle gives smallest coverage of gap regions formed between the arms and the body. Similarly, a rectangle is formed by leg nodes such as crotch, knees and ankles, and the rectangle gives smallest coverage of gap regions formed between the two legs. The potential gap regions are marked as the unknown regions, and these unknown regions are added into the optimized three-color image obtained in step S130. It should be noted that, the rectangle and triangle shown in FIG. are just examples and are determined based on forming method of gaps, and gap regions may be any other appropriate shape.

Figures 8A, 8B:
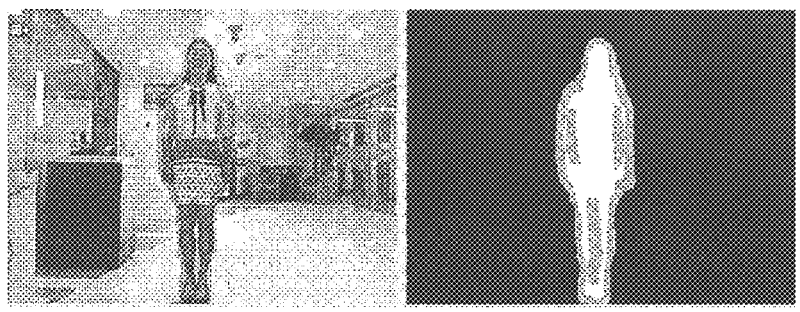
FIGS. 8A and 8B are schematic drawings illustrating gaps in an input image and a three-color image obtained by a gap marking method, respectively.

FIG. 8A is a schematic drawing illustrating gaps in an input image, and FIG. 8B is a schematic drawing illustrating a three-color image obtained by a gap marking method.

Next, in step S140, the foreground image is separated from the optimized three-color image. The three-color image may be the color-optimized three-color image obtained in step S130, or may be a three-color image after the gap marking.

As described above, the foreground image is separated by calculating an Alpha-value of a pixel p in the unknown region of the three-color image. For example, a foreground component $F_p$ and a background component $B_p$ of the pixel p may be estimated based on the sampled foreground points and background points, by performing sampling in foreground region and background region of an adjacent region of the pixel p. After obtaining $F_p$ and $B_p$, Alpha-value $\alpha_p$ of the pixel p may be obtained according to the above formula (2). It may be determined whether the pixel p belongs to the foreground region, based on the obtained Alpha-value $\alpha_p$.

For example, a predetermined threshold T of Alpha-value $\alpha_p$ may be set; when the obtained Alpha-value $\alpha_p$ is greater than or equal to the threshold T, it may be set as $\alpha_p=1$, which represents that the pixel p belongs to the foreground region; or when the obtained Alpha-value $\alpha_p$ is less than the threshold T, it may be set as $\alpha_p=0$, which represents that the pixel p belongs to the background region rather than the foreground region. The threshold T may be set based on experience or specific application by a person skilled in the art.

According to the foreground image separation method of the embodiment, an initial three-color image can be generated based on depth information from an input image and the initial three-color image can be optimized based on color information of the input image, so that a more accurate three-color image can be obtained; thus the foreground image can be accurately separated from the three-color image.

The separated foreground image may be output to a display apparatus to be displayed, or may be output to a processing apparatus to perform further processing such as combination processing for the foreground image.

In such cut-out method, the calculation of the Alpha-value of the unknown pixel p is dependent on the foreground points and background points sampled in the adjacent region of the pixel p, thus the foreground image can be separated accurately by obtaining accurate foreground and background sampling points.

Accordingly, in another embodiment of the present invention, a method for separating a foreground image based on an optimum pair of samples is provided. FIG. 9 is a flowchart illustrating a method for separating a foreground image based on an optimum pair of samples according to another embodiment of the present invention.

As illustrated in FIG. 5, the separation method includes: step S910, for each pixel in the unknown region of the optimized three-color image, selecting an optimum pair of a foreground pixel and a background pixel of the pixel from an adjacent region of the pixel; step S920, estimating, based on color values of the optimum pair of the foreground pixel and the background pixel, a foreground component and a background component of the pixel; step S930, calculating, based on the estimated foreground component and background component of the pixel, an Alpha-value of the pixel; and step S940, separating, based on the foreground region in the optimized three-color image and the Alpha-values of the pixels in the unknown region, the foreground image.

In step S910, in order to distinguish similar foreground color and background color to select an optimum pair of a foreground pixel and a background pixel, for example, to distinguish a white shirt in the foreground and a white wall in the background, a weighted linear transformation for the color information of the input image is performed by using the depth information of the input image as a weight.

In the embodiment, a transformation is performed for each object rather than each pixel. Accordingly, a clustering operation is performed for pixels in the input image based on the depth information, for example, using a conventional K-means clustering algorithm; and then clustering is performed for pixels with similar depth information, and the depth information of the pixels is set as the same value such as an average value of the depth information of all pixels in each class. The reason for such operation is that the depth information of the pixels may not be completely identical, even though such pixels belong to the same object. For example, in a case where the object is a person, since a nose and an eye of the person have different distances from a camera, the depth information of the corresponding pixels may be slightly different.

Figure 10:
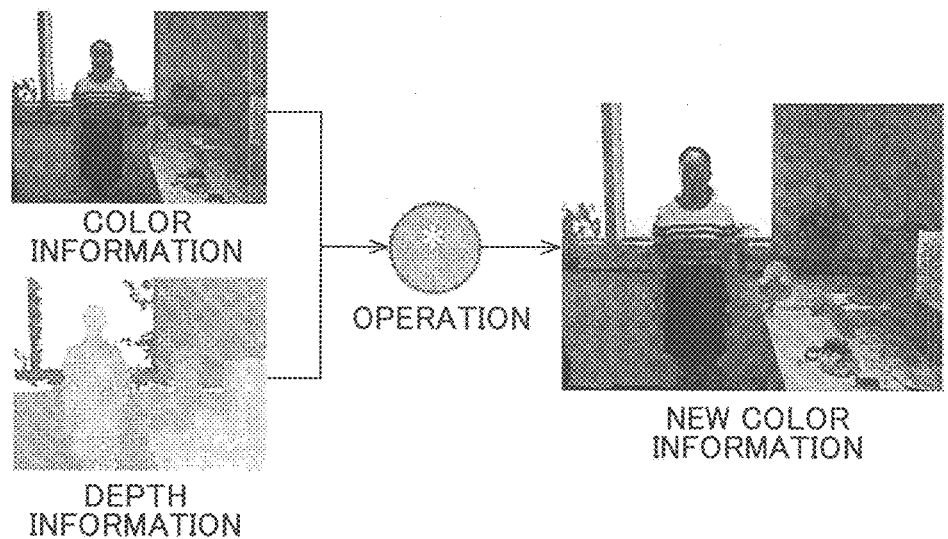
FIG. 10 is a schematic drawing illustrating transformation of color information according to an embodiment.

FIG. 10 is a schematic drawing illustrating transformation of color information according to an embodiment. As illustrated in FIG. 10, a weighted linear transformation for the color information of the input image is performed based on the clustered depth information, as shown in the following formula (3).

$$R_p = I_p * D_p + L_p \quad (3)$$

Where $I_p$ is color information of the pixel p of the input image, $D_p$ is the clustered depth information of the pixel $L_p$ is luminance information of the pixel p of the input image, and $R_p$ is the transformed color information of the pixel p. In order to avoid colors of pixels with originally different colors from becoming similar colors after the transformation operation, the luminance value $L_p$ serves as a limitation condition.

And then, the transformed color information is normalized according to the following formula (4).

$$C_p = \frac{R_p}{\max(R)} \quad (4)$$

Where Cp is the normalized color information of the pixel p. Thus, the transformed color information of the input image is obtained.

Next, for each pixel in the unknown region of the three-color image, an optimum pair of a foreground pixel and a background pixel of the pixel is selected from an adjacent region of the pixel, based on the transformed color information of the input image. The color information of the input image has low accuracy and noise, and the transformation of the color information of the input image using the depth information may still have certain limitations; thus, sampling policy of the present invention is to avoid a similar color between a foreground sample and a background sample. In the following, the sampling method of an embodiment of the present invention will be described in detail.

Figure 11A:
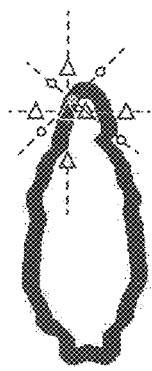
FIGS. 11A and 11B are schematic drawings illustrating a case where there is an intersection between sample points of pixels p and q, and a case where there is no intersection between sample points of pixels p and q, respectively.
Figure 11B:
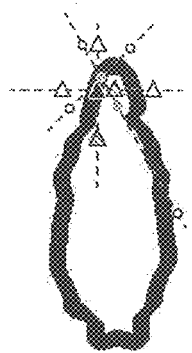

First, for each pixel in the unknown region in the optimized three-color image, a plurality of foreground pixel samples from the foreground region in the adjacent region of the pixel are selected, and a plurality of background pixel samples from the background region in the adjacent region of the pixel are selected, so that a sample set is constituted. For any one pixel p in the unknown region (hereafter referred to as a "unknown pixel p"), there is no intersection between a sample set of foreground-background sample pairs initially selected from the adjacent region and a set of the foreground-background sample pairs of an adjacent pixel q of the unknown pixel p. FIGS. 11A and 11B are schematic drawings illustrating a case where there is an intersection between sample points of pixels p and q, and a case where there is no intersection between sample points of pixels p and q, respectively.

Specifically, for example, sampling may be performed along N directions in a circular adjacent region of the unknown pixel p to obtain an initial sample set of the pixel p that includes m foreground sample points in the foreground region and n background sample points in the background region. In a specific example, N=8; however N may be any other appropriate integer values based on the specific application. Both m and n are an integer greater than 1, and m and n may be the same or different.

After selecting the sample set of the unknown pixel p, the sample points that have been selected as the sample set of the pixel p are not selected as the sample points of the pixel q again. In this way, for pixels at each position in the unknown region of the obtained three-color image, the sampling of the foreground sample points and background sample points are performed.

In the sample set constituted of the m foreground sample points and the n background sample points of the unknown pixel p, for pairs of foreground pixels and background pixels constituted of any foreground pixel and any background pixel, an energy function is constructed, and a pair of the foreground pixel and the background pixel that minimize the energy function is obtained as the optimum pair of the foreground pixel and the background pixel. There are minimum distances between the optimum sample point and the unknown pixel p in the color and the spatial position; thus the energy function is constructed based on the transformed color information and spatial position information of the pairs of the foreground pixels and the background pixels, an energy function.

Here an example of the construction of the energy function is described. In this example, an Alpha-estimating-value of the unknown pixel p may be calculated based on the color information and spatial position information of the pairs of the foreground pixels and the background pixels of the unknown pixel p. Then the Alpha-estimating-value is substituted into the above formula (2) to obtain an estimating value of the color information of pixel p. By calculating a difference between the estimating value of the color information and an actual value, the cost when the pixel p is classified as a foreground point can be obtained. Then, the energy function is constructed by accumulating the classification cost in the adjacent region of the pixel p.

For the color information, if similarity level between the unknown pixel p and a foreground sample point $f_i$ is greater than the similarity level between the pixel p and a background sample point b then the probability at which pixel p is classified as a foreground point is greater than the probability at which pixel p is classified as a background point. According to this assumption, a color information metric $PF_c$ (p;$f_i$,$b_j$) may be defined as shown in the following formula (5).

$$PF_c(p; f_i, b_j) = \frac{\|B_j - C_p\|^2}{\|F_i - C_p\|^2 + \|B_j - C_p\|^2} \tag{5}$$

Where $F_i$ is the color information of the foreground sample point $f_i$, $B_j$ is the color information of the background sample point $b_j$, and $C_p$ is the color information of the unknown pixel p. It should be noted that, the above color information is the color information in the transformed color space.

For the spatial position, if similarity level between the unknown pixel p and the foreground sample point $f_i$ is greater than the similarity level between the pixel p and the background sample point $b_j$, then the probability at which pixel p is classified as a foreground point is greater than the probability at which pixel p is classified as a background point. According to this assumption, a spatial position metric $PF_s$(p;$f_i$,$b_j$) may be defined as shown in the following formula (6).

$$PF_s(p; f_i, b_j) = \frac{\|b_j(x, y, z) - p(x, y, z)\|^2}{\|f_i(x, y, z) - p(x, y, z)\|^2 + \|b_j(x, y, z) - p(x, y, z)\|^2} \tag{6}$$

Where (x,y,z) represents three-dimensional coordinates of a pixel. The three-dimensional spatial position metric may be calculated using the depth information of a corresponding pixel.

Based on the above color and spatial position metrics, the probability at which the unknown pixel belongs to a foreground point, e.g., the Alpha-estimating-value $\tilde{\alpha}_p$ may be calculated according to the following formula (7).

$$\tilde{\alpha}_p = \frac{PF_s(p; f_i, b_j) * PF_c(p; f_i, b_j)}{PF_s(p; f_i, b_j) * PF_c(p; f_i, b_j) + (1 - PF_s(p; f_i, b_j)) * (1 - PF_c(p; f_i, b_j))} \tag{7}$$

The above calculated Alpha-estimating value and the color information of the foreground-background sample pair are substituted into the above formula (2), and then a color estimating value of the unknown pixel p can be obtained. Accordingly, an offset $M_p(F_i,B_j)$ between the color estimating value and an actual color value of the unknown pixel p is calculated as shown in the formula (8). This value describes the cost for correctly classifying the unknown pixel p using the foreground-background sample pair ($F_i$,$B_j$).

$$M_p(F_i,B_j)=\|C_p-(\tilde{\alpha}_p F_i+(1-\tilde{\alpha}_p)B_j)\| \tag{8}$$

Considering the local continuity, the offsets $M_p(F_i,B_j)$ of all of the unknown pixels q in the adjacent region $\Omega_p$ of the pixel p are accumulated, as the energy function of the unknown pixel p, as shown in the formula (9).

$$E_p(f_i, b_j) = \sum_{q \in \Omega_p} M_q(F_i, B_j)^2 \tag{9}$$

The foreground-background sample pair that minimizes $E_p(f_i,b_j)$ in the formula (9) is the optimum pair of samples. Thus, the optimum foreground-background sample pair $\tilde{f}_p,\tilde{b}_p$ may be selected from the sample set of the unknown pixel p by solving a minimum value of the formula (9) as shown the following formula (10).

$$(\tilde{f}_p,\tilde{b}_p)=\mathrm{argmin}_{f,b}E_p(f_i,b_j) \tag{10}$$

Accordingly, in step S910, for each pixel in the unknown region of the optimized three-color image, the optimum pair of the foreground pixel and the background pixel of the pixel is selected from an adjacent region of the pixel. Then, in step S920, a foreground component and a background component of the pixel are estimated based on color values of the optimum pair of the foreground pixel and the background pixel.

Because the adjacent pixels have the similar Alpha-value, average processing may be performed for the optimum foreground-background sample pair of the unknown pixel p and the optimum foreground-background sample pair selected from the adjacent region $\Omega_p$ of the pixel p to remove the noise.

Specifically, in this way, for each unknown pixel in the adjacent region $\Omega_p$ of the unknown pixel p, the corresponding optimum pair of the foreground pixel and the background pixel is obtained; and an average value of the color value of the foreground pixel in the optimum pair of the foreground pixel and the background pixel of the pixel p and color values of the foreground pixels in the optimum pairs of the foreground pixels and the background pixels of pixels in the adjacent region $\Omega_p$ of the pixel p is calculated, as an estimating value of the foreground component of the pixel p. Similarly, an average value of the color value of the background pixel in the optimum pair of the foreground pixel and the background pixel of the pixel p and color values of the background pixels in the optimum pairs of the foreground pixels and the background pixels of pixels in the adjacent region $\Omega_p$ of the pixel p is calculated, as an estimating value of the background component of the pixel p.

Accordingly, the estimating value $\hat{F}_p$ of the foreground component and the estimating value $\hat{B}_p$ of the background component of the unknown pixel p are obtained, as shown in the following formulas (11) and 12.

$$\hat{F}_p=\mathrm{avg}(\tilde{f}_{q \in \Omega_p}) \tag{11}$$

$$\hat{B}_p=\mathrm{avg}(\tilde{b}_{q \in \Omega_p}) \tag{12}$$

Next, in step S930, the Alpha-value of the pixel p may be calculated, based on the estimating value $\hat{F}_p$ of the foreground component and the estimating value $\hat{B}_p$ of the background component of the unknown pixel p. The Alpha-estimating-value $\tilde{\alpha}_p$ of the pixel p has been calculated according to the formula (7); and in order to the Alpha-value of the pixel p, it is necessary to know a confidence level for calculating the Alpha-value of the pixel p using the above estimated foreground component and background component.

Specifically, offsets between the estimating value $\hat{F}_p$ of the foreground component and the estimating value $\hat{B}_p$ of the background component of the pixel p, and an actual color value $C_p$ of the pixel are calculated, and the confidence level is calculated based on the Alpha-estimating-value of the pixel and the offsets. For example, the confidence level $CF_p$ may be calculated according to the following formula (13).

$$CF_p = \exp(-\lambda M_p(\hat{F}_p, \hat{B}_p)) \tag{13}$$

Where $\lambda$ is a decreasing factor. The confidence level $CF_p$ represents degree of reliability for calculating the Alpha-value of the pixel p using the above estimating values of the foreground component and the background component. When a color model of the unknown pixel p cannot be constructed based on the estimated foreground component and background component, the confidence level of the estimating value will become very low.

Accordingly, the Alpha-value $\alpha_p$ of the pixel p may be calculated based on the Alpha-estimating-value and the confidence level. For example, the Alpha-value $\alpha_p$ may be calculated according to the following formula (14).

$$\alpha_p = CF_p \frac{(C_p - \hat{B}_p) * (\hat{F}_p - \hat{B}_p)}{\|\hat{F}_p - \hat{B}_p\|} + (1 - CF_p)\tilde{\alpha}_p \tag{14}$$

According to the above formula (14), when the confidence level $CF_p$ of the estimated foreground component and the background component becomes very low, the value of the first term on the right side of the formula (14) is very small, and the Alpha-value $\alpha_p$ is basically equal to the Alpha-estimating-value $\tilde{\alpha}_p$; thus an unsmooth result due to a local sudden change of the Alpha-value can be avoided.

In this way, the Alpha-values of all of the unknown pixel in the unknown region of the above three-color are calculated. In step S940, the foreground image can be separated, based on the foreground region in the three-color image and the Alpha-values of the pixels in the unknown region.

Specifically, for example, the Alpha-masking of the input image may be obtained from the above three-color image and the Alpha-values of the pixels in the unknown region. A foreground masking image can be generated by performing the above threshold processing for the Alpha-masking.

For example, a predetermined threshold T of the Alpha-value may be set as described above; and for the Alpha-value of each pixel in the unknown region calculated in step S930, when the Alpha-value is greater than or equal to the threshold T, the Alpha-value may be set as 1, which represents that the pixel belongs to the foreground region; or when the Alpha-value is less than the threshold T, the Alpha-value may be set as 0, which represents that the pixel belongs to the background region rather than the foreground region. The predetermined threshold T may be set based on the experience or specific application by a person skilled in the art.

Accordingly, the foreground masking image is obtained. The foreground image can be separated by performing an AND operation between the foreground masking image and the input image.

According to the foreground image separation method of the embodiment, a weighted linear transformation can be performed for color information of an input image to distinguish similar colors in foreground and background, and an optimum sample can be selected to calculate an Alpha-value of unknown pixels since a good sampling policy is used; thus separation accuracy of the foreground image can be further improved.

Figure 12:
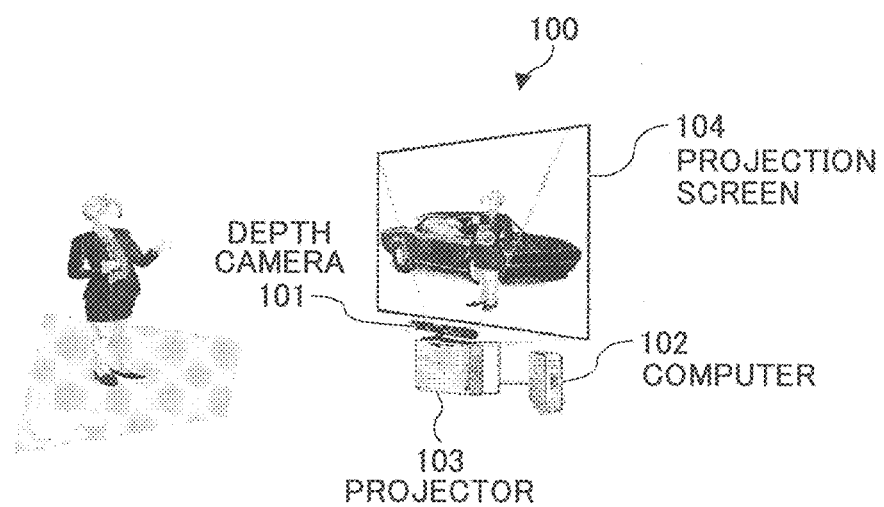
FIG. 12 is a schematic drawing illustrating a possible application scene of the method for separating a foreground image of the present invention.

As an example, FIG. 12 illustrates a possible application scene of the method for separating the foreground image of the present invention. Application system 100 may include a depth camera 101, a computer 102, a projector 103, and a projection screen 104. The depth camera 101 may be a camera that can capture both color information and depth information at the same time. The computer 102 may receive an image or a video frame of a scene captured by the depth camera 101, and corresponding color information and depth information, and may analyze the information captured by the depth camera 101 using a processor and execute the foreground image separation method to separate a foreground object from a scene. The separated foreground object may be combined with another background to be used in different application scenes. The projector 103 and the projection screen 104 may display the combined image or scene. It should be noted that, the projector 103 and the projection screen 104 are just an example of a display apparatus, and may be replaced by another display apparatus, such as a television screen or the like. It should be noted that, the system 100 described here is just an example; the present invention is not limited to this, and the configuration of the system 100 may be changed or adjusted based on specific applications.

Figure 13:
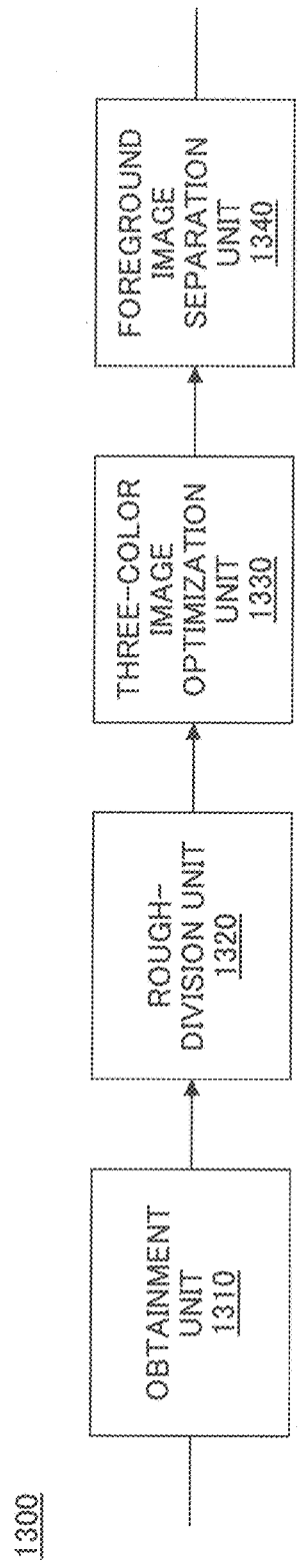
FIG. 13 is a functional block diagram illustrating an apparatus for separating a foreground image according to another embodiment of the present invention.

According to another embodiment of the present invention, an apparatus for separating a foreground image is provided. FIG. 13 is a functional block diagram illustrating an apparatus for separating a foreground image according to an embodiment of the present invention.

As shown in FIG. 13, a foreground image separation apparatus 1300 may include: an obtainment unit 1310 configured to obtain an input image, and color information and depth information of the input image; a rough-division unit 1320 configured to roughly divide, based on the depth information of the input image, the input image to obtain an initial three-color image; a three-color image optimization unit 1330 configured to reduce or expand, based on the color information of the input image, an unknown region in the initial three-color image to obtain an optimized three-color image; and a foreground image separation unit 1340 configured to separate the foreground image from the optimized three-color image.

In an embodiment, the three-color image optimization unit 1330 may divide the unknown region of the initial three-color image obtained by the rough-division unit 1320 into a plurality of local regions; and may determine, for each local region, whether color distribution in the local region satisfies a predetermined condition. When the predetermined condition is not satisfied, the three-color image optimization unit 1330 may reduce or expand the local region until the color distribution of the local region satisfies the predetermined condition, to obtain an optimized three-color image. The predetermined condition may be a condition in which there are two kinds of colors in the local region.

In another embodiment, the three-color image optimization unit 1330 may detect a gap region between constituent parts of a foreground object; and may mark the gap region in the reduced or expanded three-color image as a part of the unknown region, so as to obtain the optimized three-color image.

In another embodiment, the foreground image separation unit 1340 may select, for each pixel in the unknown region of the optimized three-color image obtained by the three-color image optimization unit 1330, an optimum pair of a foreground pixel and a background pixel of the pixel from an adjacent region of the pixel; may estimate, based on color values of the optimum pair of the foreground pixel and the background pixel, a foreground component and a background component of the pixel; may calculate, based on the estimated foreground component and background component of the pixel, an Alpha-value of the pixel; and may separate, based on the foreground region in the optimized three-color image and the Alpha-values of the pixels in the unknown region, the foreground image.

In another embodiment, specifically, the foreground image separation unit 1340 may include an optimum sample-pair selection unit (not shown) that selects an optimum sample-pair for each pixel in the known region in the optimized three-color image. The optimum sample-pair selection unit may perform a weighted linear transformation for the color information of the input image to obtain the transformed color information of the input image, by using the depth information of the input image as a weight. And then, the optimum sample-pair selection unit may select, for each pixel in the unknown region in the optimized three-color image, a plurality of foreground pixel samples from the foreground region in the adjacent region of the pixel; and may select a plurality of background pixel samples from the background region in the adjacent region of the pixel, so as to constitute a sample set. For pairs of foreground pixels and background pixels constituted of any foreground pixel and any background pixel in the sample set, an energy function is constructed, based on the transformed color information and spatial position information of the pairs of the foreground pixels and the background pixels; and a pair of the foreground pixel and the background pixel that minimizes the energy function is obtained as the optimum pair of the foreground pixel and the background pixel.

In another embodiment, specifically, the foreground image separation unit 1340 may further include an estimation unit (not shown). The estimation unit obtains, for each pixel in the adjacent region of the pixel, the corresponding optimum pair of the foreground pixel and the background pixel; calculates an average value of the color value of the foreground pixel in the optimum pair of the foreground pixel and the background pixel of the pixel and color values of the foreground pixels in the optimum pairs of the foreground pixels and the background pixels of pixels in the adjacent region of the pixel, as an estimating value of the foreground component of the pixel; and calculates an average value of the color value of the background pixel in the optimum pair of the foreground pixel and the background pixel of the pixel and color values of the background pixels in the optimum pairs of the foreground pixels and the background pixels of pixels in the adjacent region of the pixel, as an estimating value of the background component of the pixel.

In another embodiment, specifically, the foreground image separation unit 1340 may further include an Alpha-value calculation unit (not shown). The Alpha-value calculation unit calculates an Alpha-estimating-value using the estimated foreground component and background component of the pixel; calculates offsets between the estimated foreground component and background component, and an actual color value of the pixel; calculates, based on the Alpha-estimating-value of the pixel and the offsets, a confidence level for calculating the Alpha-value of the pixel using the estimated foreground component and background component of the pixel; and calculates, based on the Alpha-estimating-value and the confidence level, the Alpha-value of the pixel.

The operation of each unit of the foreground image separation apparatus 1300 shown in FIG. 13 may refer to the description of the flowchart shown in FIG. 1, and the detailed description is omitted here. According to the foreground image separation apparatus, an initial three-color image can be generated based on depth information from an input image and the initial three-color image can be optimized based on color information of the input image, so that a more accurate three-color image can be obtained; thus the foreground image can be accurately separated from the three-color image. Furthermore, according to the present invention, a weighted linear transformation can be performed for color information of an input image to distinguish similar colors in foreground and background, and an optimum sample can be selected to calculating an Alpha-value of unknown pixels since a good sampling policy is used; thus separation accuracy of the foreground image can be further improved.

Figure 14:
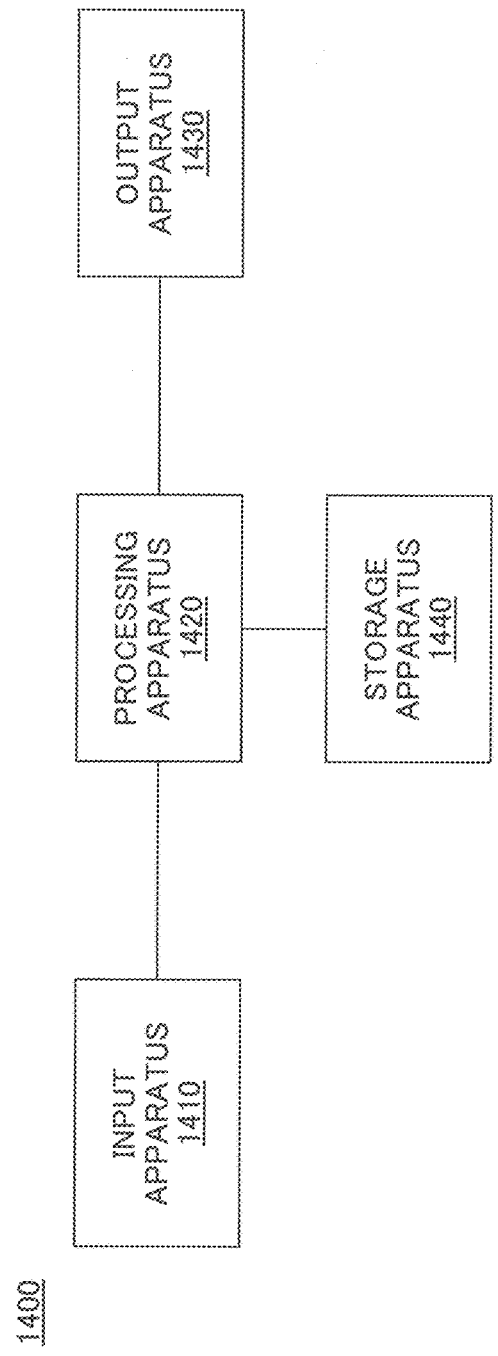
FIG. 14 is a schematic drawing illustrating the hardware configuration of a system for separating a foreground image according to an embodiment of the present invention.

Next, FIG. 14 illustrates the hardware configuration of a system for separating a foreground image according to an embodiment of the present invention. As shown in FIG. 14, the system 1400 includes: an input apparatus 1410 for inputting images to be processed from the outside, such as the above color image and grayscale image, and information to be processed, such as depth information, for example, which may include a keyboard, a mouse, a communication network and a remote input device connected thereto, etc.; a processing apparatus 1420 for implementing the above method for separating a foreground image according to the embodiments of the present invention or the above apparatus for separating a foreground image according to the embodiments of the present invention, or for performing necessary processing such as combination processing for the separated foreground, such as CPU of a computer or other chips having processing ability, etc., which are connected to a network such as the Internet (not shown) to obtain data such as an input map from the network in the process; an output apparatus 1430 for outputting the result of the foreground image separation, such as the separated foreground image and a combination result of the foreground image, such as a screen, a printer, a communication network and a remote output device connected thereto, etc.; and a storage apparatus 1440 for storing images, data, the obtained results, commands and intermediate data or the like related to the above processing, by a volatile method or a nonvolatile method, such as various kinds of volatile or nonvolatile memory including a random-access memory (RAM), a read-only memory (ROM), a hard disk and a semiconductor memory.

It should be noted that, for convenience, FIG. 14 only shows a part of the units of the system related to the present invention, and units such as a bus, input/output ports or the like are omitted. In addition, system 1400 may also include other suitable units based on a specific application condition.

The method, apparatus and system for separating a foreground image according to the embodiments of the present invention are described above in detail with reference to the accompany drawings. As an example of a foreground object, a person is described above; however, as known by a person skilled in the art, the object of the present invention is not limited to a person, and may be any other animals or objects.

The block diagrams of the units, apparatuses, devices and system are just examples; the connection, placement and configuration shown in the block diagrams related to the present invention are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not. The term "such as" means and may be changed to "such as, but not limited to".

The flowchart and the method according to the present invention are just examples, and not limited to the steps in the embodiments. The steps of the embodiments may be performed in any order. The terms "next", "subsequently" and "then" are just for describing the present invention, and the present invention is not limited to these terms. Furthermore, the articles "a" and "an" should not be limited to the singular element.

The present invention is not limited to the specifically disclosed embodiments, and various modifications, combinations and replacements may be made without departing from the scope of the present invention.

The present application is based on and claims the benefit of priority of Chinese Priority Application No. 201410645593.7 filed on Nov. 12, 2014, the entire contents of which are hereby incorporated by reference.

What is claimed is:

1. A method for separating a foreground image, the method comprising:
    obtaining an input image, and color information and depth information of the input image;
    roughly dividing, based on the depth information of the input image, the input image to obtain an initial three-color image, the initial three-color image including a foreground image, a background image, and an unknown region;
    reducing or expanding, based on the color information of the input image, the unknown region in the initial three-color image to obtain an optimized three-color image, the reducing or expanding including moving a boundary of the unknown region towards or away from a boundary of the foreground image;
    separating the foreground image from the optimized three-color image; and
    wherein the reducing or expanding the unknown region in the initial three-color image based on the color information of the input image further includes,
        dividing the unknown region of the initial three-color image into a plurality of local regions, and
        for each local region, determining whether color distribution in the local region satisfies a desired condition, and reducing or expanding the local region until the color distribution of the local region satisfies the desired condition when the desired condition is not satisfied, wherein the desired condition is a condition in which there are two kinds of color in the local region.

2. The method according to claim 1, further comprising:
    detecting a gap region between constituent parts of a foreground object; and
    marking the gap region in a reduced or expanded three-color image of the initial three-color image as a part of the unknown region, so as to obtain the optimized three-color image.

3. The method according to claim 1,
wherein the separating the foreground image from the optimized three-color image comprises:
    for each pixel in the unknown region of the optimized three-color image, selecting an optimum pair of a foreground pixel and a background pixel of the pixel from an adjacent region of the pixel;
    estimating, based on color values of the optimum pair of the foreground pixel and the background pixel, a foreground component and a background component of the pixel;
    calculating, based on the estimated foreground component and background component of the pixel, an Alpha-value of the pixel; and
    separating, based on a foreground region in the optimized three-color image and the Alpha-values of the pixels in the unknown region, the foreground image.

4. The method according to claim 3,
wherein the selecting the optimum pair of the foreground pixel and the background pixel of the pixel from the adjacent region of the pixel comprises:
    performing a weighted linear transformation for the color information of the input image to obtain the transformed color information of the input image, by using the depth information of the input image as a weight;
    for each pixel in the unknown region in the optimized three-color image, selecting a plurality of foreground pixel samples from the foreground region in the adjacent region of the pixel, and selecting a plurality of background pixel samples from a background region in the adjacent region of the pixel, so as to constitute a sample set;
    for pairs of foreground pixels and background pixels constituted of any foreground pixel and any background pixel in the sample set, constructing, based on the transformed color information and spatial position information of the pairs of the foreground pixels and the background pixels, an energy function; and
    obtaining a pair of the foreground pixel and the background pixel that minimize the energy function, as the optimum pair of the foreground pixel and the background pixel.

5. The method according to claim 4,
wherein the estimating the foreground component and the background component of the pixel based on the color values of the optimum pair of the foreground pixel and the background pixel comprises:
    for each pixel in the adjacent region of the pixel, obtaining the corresponding optimum pair of the foreground pixel and the background pixel;
    calculating an average value of the color value of the foreground pixel in the optimum pair of the foreground pixel and the background pixel of the pixel and color values of the foreground pixels in the optimum pairs of the foreground pixels and the background pixels of pixels in the adjacent region of the pixel, as an estimating value of the foreground component of the pixel; and
    calculating an average value of the color value of the background pixel in the optimum pair of the foreground pixel and the background pixel of the pixel and color values of the background pixels in the optimum pairs of the foreground pixels and the background pixels of pixels in the adjacent region of the pixel, as an estimating value of the background component of the pixel.

6. The method according to claim 5,
wherein the calculating the Alpha-value of the pixel based on the estimated foreground component and background component of the pixel comprises:
- calculating an Alpha-estimating-value using the estimated foreground component and background component of the pixel;
- calculating offsets between the estimated foreground component and background component, and an actual color value of the pixel;
- calculating, based on the Alpha-estimating-value of the pixel and the offsets, a confidence level for calculating the Alpha-value of the pixel using the estimated foreground component and background component of the pixel; and
- calculating, based on the Alpha-estimating-value and the confidence level, the Alpha-value of the pixel.

7. An apparatus for separating a foreground image, the apparatus comprising:
- a memory having computer readable instructions stored thereon; and
- at least one processor configured to execute the computer readable instructions to,
  - obtain an input image, and color information and depth information of the input image;
  - roughly divide, based on the depth information of the input image, the input image to obtain an initial three-color image, the initial three-color image including a foreground image, a background image, and an unknown region;
  - reduce or expand, based on the color information of the input image, the unknown region in the initial three-color image to obtain an optimized three-color image, the reducing or expanding including moving a boundary of the unknown region towards or away from a boundary of the foreground image;
  - separate the foreground image from the optimized three-color image;
  - divide the unknown region of the initial three-color image into a plurality of local regions; and
  - for each local region, determine whether color distribution in the local region satisfies a desired condition, and reduce or expand the local region until the color distribution of the local region satisfies the desired condition when the desired condition is not satisfied, wherein the desired condition is a condition in which there are two kinds of color in the local region.

8. The apparatus according to claim 7, wherein the at least one processor is further configured to:
- detect a gap region between constituent parts of a foreground object; and
- mark the gap region in a reduced or expanded three-color image of the initial three-color image as a part of the unknown region, so as to obtain the optimized three-color image.

9. The apparatus according to claim 7, wherein the at least one processor is further configured to separate the foreground image from the optimized three-color image by:
- for each pixel in the unknown region of the optimized three-color image, selecting an optimum pair of a foreground pixel and a background pixel of the pixel from an adjacent region of the pixel;
- estimating, based on color values of the optimum pair of the foreground pixel and the background pixel, a foreground component and a background component of the pixel;
- calculating, based on the estimated foreground component and background component of the pixel, an Alpha-value of the pixel; and
- separating, based on a foreground region in the optimized three-color image and the Alpha-values of the pixels in the unknown region, the foreground image.

10. The apparatus according to claim 9, wherein the at least one processor is further configured to select the optimum pair of the foreground pixel and the background pixel of the pixel from the adjacent region of the pixel by:
- performing a weighted linear transformation for the color information of the input image to obtain the transformed color information of the input image, by using the depth information of the input image as a weight;
- for each pixel in the unknown region in the optimized three-color image, selecting a plurality of foreground pixel samples from the foreground region in the adjacent region of the pixel, and selecting a plurality of background pixel samples from a background region in the adjacent region of the pixel, so as to constitute a sample set;
- for pairs of foreground pixels and background pixels constituted of any foreground pixel and any background pixel in the sample set, constructing, based on the transformed color information and spatial position information of the pairs of the foreground pixels and the background pixels, an energy function; and
- obtaining a pair of the foreground pixel and the background pixel that minimize the energy function, as the optimum pair of the foreground pixel and the background pixel.

11. The apparatus according to claim 9, wherein the at least one processor is further configured to estimate the foreground component and the background component of the pixel based on the color values of the optimum pair of the foreground pixel and the background pixel by:
- for each pixel in the adjacent region of the pixel, obtaining the corresponding optimum pair of the foreground pixel and the background pixel;
- calculating an average value of the color value of the foreground pixel in the optimum pair of the foreground pixel and the background pixel of the pixel and color values of the foreground pixels in the optimum pairs of the foreground pixels and the background pixels of pixels in the adjacent region of the pixel, as an estimating value of the foreground component of the pixel; and
- calculating an average value of the color value of the background pixel in the optimum pair of the foreground pixel and the background pixel of the pixel and color values of the background pixels in the optimum pairs of the foreground pixels and the background pixels of pixels in the adjacent region of the pixel, as an estimating value of the background component of the pixel.

12. The apparatus according to claim 9, the at least one processor is further configured to calculate the Alpha-value of the pixel based on the estimated foreground component and background component of the pixel by:
- calculating an Alpha-estimating-value using the estimated foreground component and background component of the pixel;
- calculating offsets between the estimated foreground component and background component, and an actual color value of the pixel;
- calculating, based on the Alpha-estimating-value of the pixel and the offsets, a confidence level for calculating the Alpha-value of the pixel using the estimated foreground component and background component of the pixel; and
- calculating, based on the Alpha-estimating-value and the confidence level, the Alpha-value of the pixel.

13. A non-transitory computer-readable recording medium having stored therein computer readable instructions, which when executed by at least one processor, causes the at least one processor to execute a process for separating a foreground image, the process comprising:

obtaining an input image, and color information and depth information of the input image;

roughly dividing, based on the depth information of the input image, the input image to obtain an initial three-color image, the initial three-color image including a foreground image, a background image, and an unknown region;

reducing or expanding, based on the color information of the input image, the unknown region in the initial three-color image to obtain an optimized three-color image, the reducing or expanding including moving a boundary of the unknown region towards or away from a boundary of the foreground image;

separating the foreground image from the optimized three-color image; and wherein the reducing or expanding the unknown region in the initial three-color image based on the color information of the input image further includes, dividing the unknown region of the initial three-color image into a plurality of local regions, and for each local region, determining whether color distribution in the local region satisfies a desired condition, and reducing or expanding the local region until the color distribution of the local region satisfies the desired condition when the desired condition is not satisfied, wherein the desired condition is a condition in which there are two kinds of color in the local region.

14. The non-transitory computer-readable recording medium according to claim 13, wherein the process further comprises:

detecting a gap region between constituent parts of a foreground object; and marking the gap region in a reduced or expanded three-color image of the initial three-color image as a part of the unknown region, so as to obtain the optimized three-color image.

15. The non-transitory computer-readable recording medium according to claim 13, wherein the separating the foreground image from the optimized three-color image comprises:

for each pixel in the unknown region of the optimized three-color image, selecting an optimum pair of a foreground pixel and a background pixel of the pixel from an adjacent region of the pixel, the selecting the optimum pair of the foreground pixel and the background pixel of the pixel from the adjacent region of the pixel including, performing a weighted linear transformation for the color information of the input image to obtain the transformed color information of the input image, by using the depth information of the input image as a weight, for each pixel in the unknown region in the optimized three-color image, selecting a plurality of foreground pixel samples from a foreground region in the adjacent region of the pixel, and selecting a plurality of background pixel samples from a background region in the adjacent region of the pixel, so as to constitute a sample set, for pairs of foreground pixels and background pixels constituted of any foreground pixel and any background pixel in the sample set, constructing, based on the transformed color information and spatial position information of the pairs of the foreground pixels and the background pixels, an energy function, and obtaining a pair of the foreground pixel and the background pixel that minimize the energy function, as the optimum pair of the foreground pixel and the background pixel.

16. The non-transitory computer-readable recording medium according to claim 15, wherein the separating the foreground image from the optimized three-color image comprises:

estimating, based on color values of the optimum pair of the foreground pixel and the background pixel, a foreground component and a background component of the pixel;

calculating, based on the estimated foreground component and background component of the pixel, an Alpha-value of the pixel; and separating, based on the foreground region in the optimized three-color image and the Alpha-values of the pixels in the unknown region, the foreground image.

17. The non-transitory computer-readable recording medium according to claim 16, wherein the estimating the foreground component and the background component of the pixel based on the color values of the optimum pair of the foreground pixel and the background pixel comprises:

for each pixel in the adjacent region of the pixel, obtaining the corresponding optimum pair of the foreground pixel and the background pixel;

calculating an average value of the color value of the foreground pixel in the optimum pair of the foreground pixel and the background pixel of the pixel and color values of the foreground pixels in the optimum pairs of the foreground pixels and the background pixels of pixels in the adjacent region of the pixel, as an estimating value of the foreground component of the pixel; and calculating an average value of the color value of the background pixel in the optimum pair of the foreground pixel and the background pixel of the pixel and color values of the background pixels in the optimum pairs of the foreground pixels and the background pixels of pixels in the adjacent region of the pixel, as an estimating value of the background component of the pixel.

18. The non-transitory computer-readable recording medium according to claim 16, the calculating the Alpha-value of the pixel based on the estimated foreground component and background component of the pixel comprises:

calculating an Alpha-estimating-value using the estimated foreground component and background component of the pixel;

calculating offsets between the estimated foreground component and background component, and an actual color value of the pixel;

calculating, based on the Alpha-estimating-value of the pixel and the offsets, a confidence level for calculating the Alpha-value of the pixel using the estimated foreground component and background component of the pixel; and calculating, based on the Alpha-estimating-value and the confidence level, the Alpha-value of the pixel.

* * * * *